(12) United States Patent
Suh et al.

(10) Patent No.: US 8,123,820 B2
(45) Date of Patent: Feb. 28, 2012

(54) METHOD OF PREPARING POSITIVE ACTIVE MATERIAL FOR A LITHIUM SECONDARY BATTERY

(75) Inventors: Jun-Won Suh, Suwon (KR); Ho-Jin Kweon, Kyungki-do (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 693 days.

(21) Appl. No.: 12/232,965

(22) Filed: Sep. 26, 2008

(65) Prior Publication Data

US 2009/0098278 A1    Apr. 16, 2009

Related U.S. Application Data

(62) Division of application No. 10/409,160, filed on Apr. 9, 2003, now Pat. No. 7,445,871.

(30) Foreign Application Priority Data

May 13, 2002  (KR) .................. 10-2002-0026200

(51) Int. Cl.
*H01M 4/1391* (2010.01)
*H01M 4/505* (2010.01)
*H01M 4/525* (2010.01)

(52) U.S. Cl. ..... 29/623.1; 429/223; 429/224; 429/231.3

(58) Field of Classification Search .................. 29/623.1; 429/223, 224, 231.3
See application file for complete search history.

(56) References Cited

U.S. PATENT DOCUMENTS

| | | |
|---|---|---|
| 5,393,622 A | 2/1995 | Nitta et al. |
| 5,626,635 A | 5/1997 | Yamaura et al. |
| 5,762,900 A | 6/1998 | Kweon et al. |
| 6,040,089 A | 3/2000 | Manev et al. |
| 6,071,645 A | 6/2000 | Biensan et al. |
| 6,183,911 B1 | 2/2001 | Kweon et al. |
| 6,372,385 B1 | 4/2002 | Kweon et al. |
| 6,579,475 B2 | 6/2003 | Gao et al. |
| 6,660,432 B2 | 12/2003 | Paulsen et al. |
| 6,753,111 B2 | 6/2004 | Kweon et al. |
| 6,783,890 B2 | 8/2004 | Kweon et al. |

FOREIGN PATENT DOCUMENTS

| | | |
|---|---|---|
| CN | 1228620 | 9/1999 |
| JP | 08-298115 | 11/1996 |
| JP | 09-055210 | 2/1997 |
| JP | 2000-072443 | 3/2000 |

OTHER PUBLICATIONS

Office action from the Chinese Patent Office issued in Applicant's corresponding Chinese Patent Application No. 03130675.6 dated Sep. 11, 2009 along with an English language translation.

*Primary Examiner* — Tracy Dove (74) *Attorney, Agent, or Firm* — Robert E. Bushnell, Esq.

(57) ABSTRACT

A process of manufacturing a positive active material for a lithium secondary battery includes adding a metal source to a doping element-containing coating liquid to surface-treat the metal source, wherein the metal source is selected from the group consisting of cobalt, manganese, nickel, and combination thereof; drying the surface-treated metal source material to prepare a positive active material precursor; mixing the positive active material precursor with a lithium source; and subjecting the mixture to heat-treatment. Alternatively, the above drying step during preparation of the positive active material precursor is substituted by preheat-treatment or drying followed by preheat-treatment.

9 Claims, 6 Drawing Sheets

METHOD OF PREPARING POSITIVE ACTIVE MATERIAL FOR A LITHIUM SECONDARY BATTERY

CLAIM OF PRIORITY AND CROSS-REFERENCE TO RELATED APPLICATION

This application makes reference to, incorporates the same herein, and claims all benefits accruing under 35 U.S.C. §119 from an application for METHOD OF PREPARING POSITIVE ACTIVE MATERIAL FOR A LITHIUM SECONDARY BATTERY earlier filed in the Korean Intellectual Property Office on 13 May 2002 and there duly assigned Serial No. 2002-26200. Furthermore, this application is a divisional of Applicants' Ser. No. 10/409,160 filed in the U.S. Patent & Trademark Office on 9 Apr. 2003, now issued as U.S. Pat. No. 7,445,871 on 4 Nov. 2008, and assigned to the assignee of the present invention.

BACKGROUND OF THE INVENTION

1. Field of the Invention

The present invention relates to a process of preparing a positive active material for a lithium secondary battery, and more specifically, to a process of preparing a positive active material for a lithium secondary battery with high discharge potential, high power density, high rate capability, and good cycle life characteristics.

2. Description of the Related Art

Generally, rechargeable lithium batteries use a material from or into which lithium ions are deintercalated or intercalated for positive and negative active materials. For the electrolyte, an organic solution of a lithium salt or a lithium ion-conducting polymer is used. A rechargeable lithium battery produces electrical energy as a result of changes in the chemical potentials of the active materials during the intercalation and deintercalation reactions of the lithium ions.

Among the active materials which have been considered for the active material of negative electrodes of batteries, lithium metal gives both high cell capacity and high voltage because it has a high electrical capacity per unit mass and relatively high electronegativity. However, since it is difficult to assure the safety of a battery using lithium metal, a carbonaceous material that is capable of intercalating and deintercalating lithium ions is used extensively for the active material of the negative electrodes in lithium secondary batteries.

Lithium metal compounds of a complex formula are often used as a positive active material of the lithium secondary battery. Typical examples include lithium-containing compounds such as $LiCoO_2$, $LiMn_2O_4$, $LiNiO_2$, $LiNi_{1-x}Co_xO_2$ (0<x<1), and $LiMnO_2$. Manganese-based positive active materials such as $LiMn_2O_4$ or $LiMnO_2$ have relatively good safety properties, are less costly than the other materials, and are environmentally friendly. However, these manganese-based materials have a disadvantage of a relatively low capacity. $LiNiO_2$ has the highest discharge capacity of all the positive active materials mentioned above, but it is difficult to synthesize and it is the least thermally stable among the compounds mentioned above. $LiCoO_2$ has many technical advantages over the other materials, such as relatively good cycle life and relatively high specific energy. Accordingly, this compound is presently the most popular material for positive electrodes of commercially available Li-ion batteries, even though its cost is relatively high.

These lithium-containing compounds are currently synthesized using a solid-phase process. For example, a lithium compound (lithium source) such as LiOH or $Li_2CO_3$ and a cobalt compound (cobalt source) are mixed at a desirable equivalent ratio followed by calcinating the mixture at a temperature of 800-1000° C. to prepare $LiCoO_2$. A transition metal source may be added to the mixture of the lithium source and cobalt source prior to the calcination to improve charge/discharge characteristics of the $LiCoO_2$.

Recently, with an increased demand for portable electronic equipment that is more compact and lightweight, there has been an increased demand for various types of batteries including a Li-ion battery with an improved active material that can assure good battery performance such as high discharge potential, high power density, high rate capability, and good cycle life characteristics.

SUMMARY OF THE INVENTION

It is therefore an object of the present invention to provide an improved process of preparing a positive active material for a lithium secondary battery with good electrochemical characteristics including cycle life, discharge potential, and power capability.

Additional objects and advantages of the invention will be set forth in part in the description which follows, and in part will be obvious from the description, or may be learned by practice of the invention.

In order to accomplish these and other objects, one embodiment of the present invention provides a process of preparing a positive active material for a lithium secondary battery comprising adding a metal source to a doping element-containing coating liquid to surface-treat the metal source, wherein the metal source is selected from the group consisting of cobalt, manganese, nickel, and a combination thereof; drying the surface-treated metal source material to prepare a positive active material precursor; mixing the positive active material precursor and a lithium source; and subjecting the mixture to heat-treatment.

According to another embodiment of the present invention, the drying process during a preparation of the positive active material precursor is substituted by preheat-treatment or drying followed by preheat-treatment.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

Reference will now be made in detail to the present embodiments of the present invention, examples of which are illustrated in the accompanying drawings and specific Examples, wherein like reference numerals refer to like elements throughout. The embodiments are described below in order to explain the present invention by referring to the figures and the specific Examples.

In the present invention, doping elements are introduced to a positive active material precursor through coating, and the precursor and a lithium-containing compound are mixed followed by heat-treatment to prepare a positive active material including doping elements.

Conventionally, a positive active material including doping elements is prepared through the following processes: a lithium source, a metal source, and a doping element source are mixed in a solid powder state and heat-treated. However, this method has a shortcoming in that the doping elements are not introduced in the positive active material uniformly and thereby there is a limit for improving electrochemical properties of the positive active material produced through this method. The inventor of the present invention has filed Korean Application No. 2001-31530, the disclosure of which is incorporated herein by reference, wherein doping elements are introduced to the positive active material uniformly by coating the positive active material with a doping element-containing coating liquid to improve electrochemical performance such as high rate properties, power capability, cycle life characteristics, and initial discharge capacity of the positive active material. In the above application, the positive active material is produced through coating of a resulting material with a doping element-containing coating liquid. But in the present invention, the positive active material is produced through coating of an intermediate material with a doping element-containing coating liquid.

Electrodes of a lithium secondary battery are fabricated by coating a slurry including an active material on a current collector, dried and compressed. In the case that the positive active material is a lithium-nickel-manganese-based compound, gelation occurs during preparation of the slurry. It is desirable for the slurry for preparing an electrode to have a viscosity of 4000 to 7000 centipoise (cps). When the viscosity is below the lower limit, fluidity of the slurry is large and desirable coating properties may not be obtained, and when the viscosity is higher than the upper limit, uniform coating cannot be obtained. The positive active material prepared through the present invention does not cause gelation during preparation of the slurry, and is advantageous for controlling the viscosity of the slurry to be suitable for coating on the current collector.

Hereinafter, the process of preparing the positive active material of the present invention is explained in further detail. A metal source (intermediate material) is added to a doping element-containing coating liquid to surface-treat the metal source.

For the doping element, any element can be used if it is soluble or suspendable in an organic solvent or water. According to one example, the doping element is at least one selected from the group consisting of Mg, Al, Co, Ni, K, Na, Ca, Si, Fe, Cu, Zn, Ti, Sn, V, Ge, Ga, B, P, Se, Bi, As, Zr, Mn, Cr, Sr, Sc, Y, a rare earth element (for example La, Ce), or a combination thereof, and it preferably includes Mg, Al, Co, Ni, Fe, Zr, Mn, Cr, Sr, V, or a combination thereof.

The doping element-containing coating liquid is prepared by adding a doping-element source to a volatile organic solvent or water. In this embodiment of the invention, "coating liquid" refers to a homogeneous suspension or a solution. The doping-element source includes any doping-element or any doping-element-containing compound that is soluble or suspendable in the organic solvent or water. The doping-element source may include a doping-element; a doping-element-containing alkoxide such as methoxide, ethoxide, or isopropoxide; a doping-element-containing salt; or a doping-element-containing oxide.

A suitable type of doping-element-containing compound can easily be chosen by one having ordinary skill in the art. For an example of the doping-element source, tetraethyl orthosilicate may be used as a silicon source, whereas $B_2O_3$, $H_3BO_3$, or $HB(OH)_2$ can be used as a boron source. $HB(OH)_2$ is prepared by dissolving $B_2O_3$ in an organic solvent or water followed by drying the liquid. When vanadium is used as a doping-element, vanadium oxide ($V_2O_5$) or vanadate such as ammonium vanadate ($NH_4(VO)_3$) may be examples of the doping element source.

Examples of the volatile organic solvents according to embodiments of the invention include, but are not limited to, $C_1$ to $C_4$ straight or branched alcohols such as methanol, ethanol, or isopropanol. Other solvents according to embodiments of the invention include ether, methylene carbonate, and acetone.

The amount of the doping element is preferably 0.01 to 20 wt % of the coating liquid, preferably 0.01 to 10 wt %. When the amount is below 0.01 wt %, the subsequent drying process takes too long, and when the amount of the doping element is more than 20 wt %, it is difficult to prepare a coating liquid suitable for doping.

The metal source includes a material including cobalt, manganese, nickel, or a combination thereof. Examples of manganese sources include manganese acetate, manganese dioxide, or manganese nitrate; examples of cobalt sources are cobalt hydroxide, cobalt oxide, cobalt nitrate, and cobalt carbonate; and examples of nickel sources are nickel hydroxide, nickel nitrate, and nickel acetate, but they are not limited thereto. Fluoride sources, sulfur sources, or phosphorous sources may be further introduced to the metal source together with the manganese sources, cobalt sources, or nickel sources. The fluoride sources may be manganese fluoride or lithium fluoride, and the sulfur sources may be manganese sulfide or lithium sulfide. A phosphorous source may be $H_3PO_4$. These compounds are preferable examples, but the present invention is not limited thereto.

The metal source may include at least two metals. These metal sources can be prepared using a solid phase synthesis method or a co-precipitation method. In the former method, at least two metal sources in a solid powder state are mixed and heat-treated to prepare a metal source including at least two metals. In the latter method, at least two metal sources in a solution state are mixed and the pH of the mixture is controlled to prepare a metal source including at least two metals.

The metal source as described above is surface-treated (coated) with a doping-element-containing liquid. The coating process may be performed by a wet-coating method such as a dipping method or a spray method. The dipping method includes dipping the metal source in the coating liquid, removing excess liquid if necessary, and then drying the coated active material. Generally, the dip coating method is used.

Subsequent to the wet coating, the coated metal source is subjected to one process selected from drying, preheating, and drying-and-preheating to prepare a positive active material precursor.

The drying operation is performed at a temperature in the range from room temperature (i.e., roughly 20° C.) to 300° C., for 1 to 24 hours. When the drying temperature is lower than room temperature, the drying time is unduly prolonged. If the drying temperature is too high, e.g., much higher than 300° C., this process is defined as a preheating process. When the drying duration is too short, e.g., much shorter than 1 hour, solvent drying is not sufficient. If the drying duration is too long, e.g., much longer than 24 hours, the drying process is unduly prolonged.

The preheating operations are performed at a temperature in the range of 300° C. to 1000° C., for 1 to 24 hours. When the preheating temperature is lower than 300° C., this process is defined as a drying process. If the preheating temperature is too high, e.g., much higher than 1000° C., the volatile doping elements may be removed to change the equivalent composition of the resulting positive active material. When the preheating duration is too short, e.g., much shorter than 1 hour, solvent drying is not sufficient. If the preheating duration is too long, e.g., much longer than 24 hours, the preheating process is unduly prolonged.

The "drying-and-preheating" means that the drying operation is performed under the same condition of the above drying operation, and subsequently the preheating operation is performed under the same condition of the above preheating operation.

Through drying, preheating, or drying-and-preheating process, a positive active material precursor (metal source) surface-treated with a doping element is produced. That is to say, a surface-treatment layer comprising at least one doping-element-containing compound is formed on the surface of the positive active material precursor. The doping-element-containing compound has an amorphous, a semi-crystalline, or a crystalline phase, or a mixture of these phases. Particularly, through preheating or drying-and-preheating process, a solid solution compound between the doping element and the metal source may be produced.

The surface-treated positive active material and a lithium source are mixed at an desirable equivalent ratio and heat-treated. The heat-treatment process is preferably performed twice. A first heat-treatment step is preferably performed at about 400 to 500° C. for 5 to 20 hours, and a second heat-treatment step is preferably performed at about 700 to 900° C. for 10 to 30 hours. If the first heat-treatment step temperature is less than 400° C., the metal sources may not react completely with the lithium sources, and if the first heat-treatment step temperature is more than 500° C., the lithium element, which has a melting point of 453.2° C., may be lost. If the second heat-treatment step temperature is less than 700° C., the resulting crystalline material is not produced, and if the second heat-treatment step temperature is more than 900° C., the lithium element is evaporated resulting in a positive active material with an undesirable equivalent ratio and excessive crystallinity. The excessive crystallinity may prevent movement of lithium ions during charge and discharge.

The first heat-treated positive active material may be cooled to room temperature and then ground further before the second heat-treatment to obtain a positive active material, a lithiated intercalation compound with uniform composition.

The lithiated intercalation compound produced in accordance with the above processes may or may not be sieved to obtain a powder with a desirable average diameter.

Examples of the lithiated intercalation compound are represented in the following formulas (1) to (11):

$$Li_xMn_{1-y}M'_zA_2 \quad (1)$$

$$Li_xMn_{1-y}M'_zO_{2-a}X_a \quad (2)$$

$$Li_xMn_{2-y}M'_zA_4 \quad (3)$$

$$Li_xCo_{1-y}M'_zA_2 \quad (4)$$

$$Li_xCo_{1-y}M'_zO_{2-a}X_a \quad (5)$$

$$Li_xNi_{1-y}M'_zA_2 \quad (6)$$

$$Li_xNi_{1-y}M'_zO_{2-a}X_a \quad (7)$$

$$Li_xNi_{1-y}Co_zM'_wA_b \quad (8)$$

$$Li_xNi_{1-y}Co_zM'_wO_{2-b}X_b \quad (9)$$

$$Li_xNi_{1-y}Mn_zM'_wA_b \quad (10)$$

$$Li_xNi_{1-y-z}Mn_zM'_wO_{2-b}X_b \quad (11)$$

wherein
0.9≦x≦1.1; 0≦y≦0.5; 0≦z≦0.5; ≦0≦w≦2; 0≦a≦0.5; 0≦b≦2;

M' is at least one doping element selected from the group consisting of Mg, Al, Co, Ni, K, Na, Ca, Si, Fe, Cu, Zn, Ti, Sn, V, Ge, Ga, B, P, Se, Bi, As, Zr, Mn, Cr, Sr, and rare earth elements;

A is at least one element selected from the group consisting of O, F, S, and P; and X is at least one element selected from the group consisting of F, S, and P.

The amount of the doping element is in a range of 0.0001 to 20 wt %, and preferably in the range of 0.01 to 10 wt % of the positive active material, the lithiated intercalation compound. When the amount thereof is below 0.0001 wt %, the effect of doping may not be sufficiently high to be effective. When the amount of the doping element is above 20 wt %, the electrode capacity may be reduced.

The positive active material is applied to a positive electrode of a lithium secondary battery as follows: a positive active material slurry is prepared by mixing the positive active material, binder material, and conductive agent in an organic solvent. The positive electrode is generally fabricated by casting (coating) the slurry on a current collector and drying it, and then compressing the coated current collector.

Figure 1:
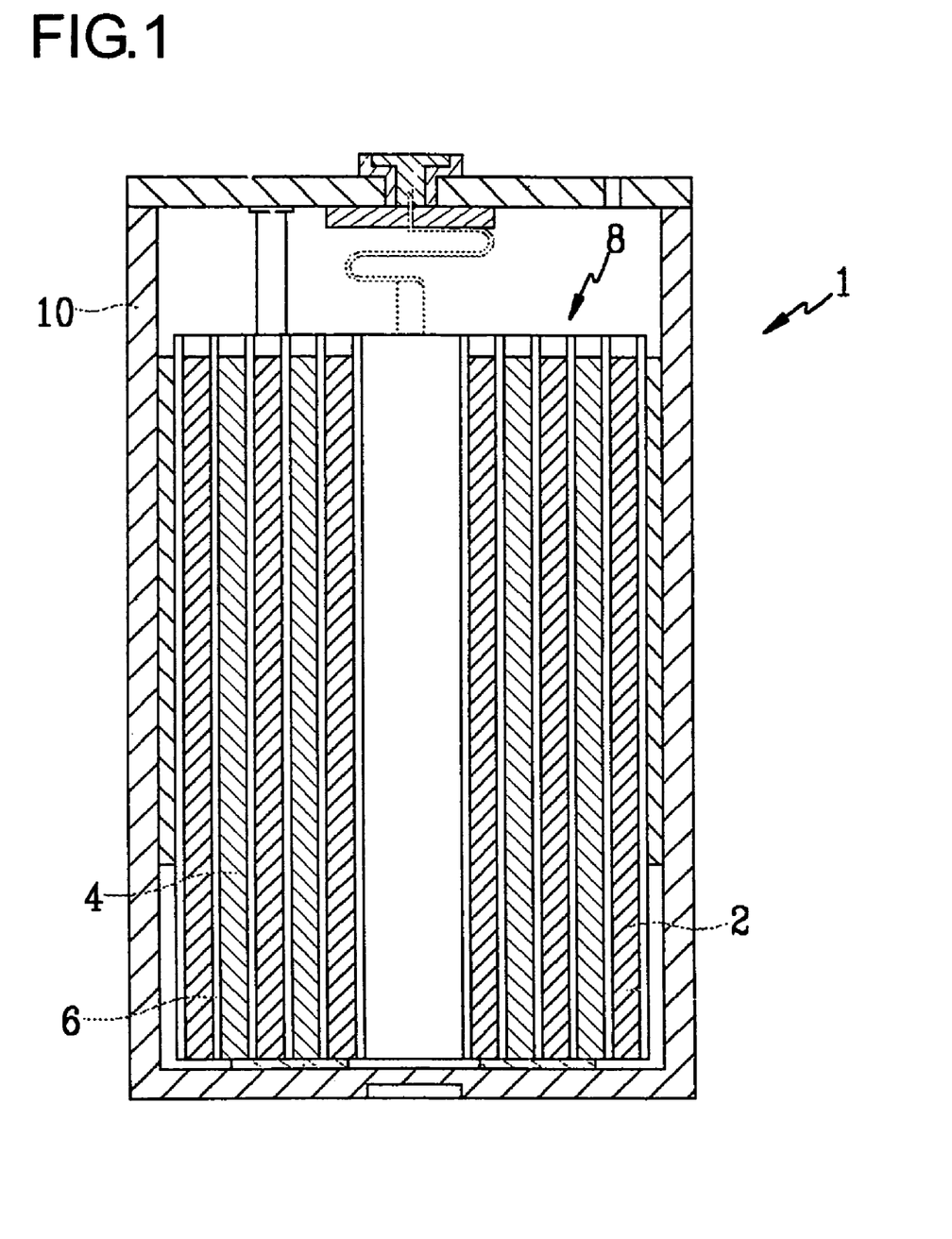
FIG. 1 illustrates a cross-sectional view of a lithium secondary battery cell.

A cross-sectional view of a prismatic lithium secondary battery cell according to an embodiment of the present invention is illustrated in FIG. 1. As shown in FIG. 1, the lithium secondary battery 1 is fabricated by the following process. An electrode assembly 8 is prepared by winding a positive electrode 2, a negative electrode 4, and a separator 6 interposed between the positive and negative electrodes 2 and 4, then placing the electrode assembly 8 into a battery case 10. An electrolyte is injected in the case 10, and the upper part of the battery case 10 is sealed. In the battery, a conventional negative electrode 4 and electrolyte can be used. The negative electrode 4 comprises a material that can reversibly deintercalate/intercalate lithium ions, such as a carbonaceous material. The electrolyte comprises lithium salts and organic solvents. It is understood that other types of batteries can be constructed using the coated active material of the present invention. Further, it is understood that, when the electrolyte is a solid electrolyte, the separator 6 and the electrolyte need not be included separately.

The present invention is further explained in more detail with reference to the following examples. These examples, however, should not in any sense be interpreted as limiting the scope of the present invention.

Comparative Example 1

LiOH.H$_2$O and Co$_3$O$_4$ powders were weighed in a Li/Co equivalent ratio of 1/1 and mixed in a mortar grinder. The resultant mixture was subjected to a first heat-treatment for 5 hours at 450° C. while purging with a stream of dry air at 3 liter/min, and then it was uniformly mixed in a mortar grinder at room temperature. A second heat-treatment was performed for 10 hours at 800° C. while purging with a stream of dry air at 3 liter/minutes to produce a positive active material, $LiCoO_2$ powder. The $LiCoO_2$ powder was sieved using a −325 mesh.

The resultant $LiCoO_2$ powder for a positive active material, KF 1300 for a binder material, and Super P for a conductive agent were mixed in a weight ratio of 96/2/2 in N-methylpyrrolidone to prepare a positive active material slurry. The positive active material slurry was cast onto a 25 μm thick Al foil in a thickness of about 100 μm, followed by drying and compressing the coated Al foil. The resultant slurry-coated Al foil was cut into a disk having a diameter of 1.6 cm (area of 2 $cm^2$) to prepare a positive electrode.

Using the positive electrode and a lithium counter electrode, a 2016 coin-type half-cell was fabricated in an Ar-purged glove box. For the electrolyte, a 1 M $LiPF_6$ solution in ethylene carbonate and dimethyl carbonate (1:1 volume ratio) was used.

Comparative Example 2

A coin-type half-cell was fabricated by the same procedure as in Comparative Example 1, except that the equivalent ratio of Li/Co was 1/0.98, and the resulting positive active material was $LiCo_{0.98}O_2$ powder.

Comparative Example 3

A coin-type half-cell was fabricated by the same procedure as in Comparative Example 1, except that $LiOH \cdot H_2O$, $Co_3O_4$, and $Al_2O_3$ powders were used at a Li/Co/Al equivalent ratio of 1/1/0.1, and the resulting positive active material was $LiCoAl_{0.1}O_2$ powder.

Comparative Example 4

$Ni(NO_3)_2$ and $Mn(NO_3)_2$ were respectively dissolved in water, to prepare a Ni-containing solution and a Mn-containing solution. The two solutions were mixed, and $NH_4OH$ was added to control pH of the mixed solution. Ni and Mn were co-precipitated to prepare $Ni_{0.8}Mn_{0.2}(OH)_2$.

LiOH and $Ni_{0.8}Mn_{0.2}(OH)_2$ powders were weighed in a Li/(Ni+Mn) equivalent ratio of 1/1, and mixed in a mortar grinder in ethanol for 30 minutes The resultant mixture was subjected to a first heat-treatment for 10 hours at 450° C., and was mixed uniformly in a mortar grinder after being cooled to room temperature. A second heat-treatment was performed for 10 hours at 750° C., to produce a positive active material, $LiNi_{0.8}Mn_{0.2}O_2$ powder. The $LiNi_{0.8}Mn_{0.2}O_2$ powder was then sieved using a −325 mesh.

The resultant $LiNi_{0.8}Mn_{0.2}O_2$ powder for a positive active material, KF 1300 for a binder material, and Super P for a conductive agent were mixed in a weight ratio of 94/3/3 in N-methyl pyrrolidone to prepare a positive active material slurry. Using the slurry, a coin cell-type half-cell was fabricated by the same procedure as in Comparative Example 1.

Comparative Example 5

$Ni(NO_3)_2$, $Mn(NO_3)_2$, and $Co(NO_3)_2$ were respectively dissolved to water to prepare a Ni-containing solution, a Mn-containing solution, and a Co-containing solution. The three solutions were mixed, and $NH_4OH$ was added to control pH of the mixed solution. Ni, Mn, and Co were co-precipitated to prepare $Ni_{0.8}Mn_{0.1}Co_{0.1}(OH)_2$.

LiOH and $Ni_{0.8}Mn_{0.1}Co_{0.1}(OH)_2$ powders were weighed in a Li/(Ni+Mn+Co) equivalent ratio of 1.03/1 and mixed in ethanol for 30 minutes by ball-milling. The resultant mixture was subjected to a first heat-treatment for 5 hours at 500° C., and it was then mixed uniformly in a mortar grinder after being cooled to room temperature. A second heat-treatment was performed for 15 hours at 800° C. to produce a positive active material, $Li_{1.03}Ni_{0.8}Mn_{0.1}Co_{0.1}O_2$ powder. The $Li_{1.03}Ni_{0.8}Mn_{0.1}Co_{0.1}O_2$ powder was sieved using a −325 mesh.

The resultant $Li_{1.03}Ni_{0.8}Mn_{0.1}Co_{0.1}O_2$ powder for a positive active material, KF 1300 for a binder material, and Super P for a conductive agent were mixed in a weight ratio of 94/3/3 in N-methylpyrrolidone to prepare a positive active material slurry. Using the slurry, a coin cell-type half-cell was fabricated by the same procedure as in Comparative Example 1.

Comparative Example 6

$Ni(NO_3)_2$ and $Co(NO_3)_2$ were respectively dissolved in water to prepare a Ni-containing solution and a Co-containing solution. The two solutions were mixed and $NH_4OH$ was added to control pH of the mixed solution. Ni and Co were coprecipitated to prepare $Ni_{0.9}Co_{0.1}(OH)_2$.

LiOH and $Ni_{0.9}Co_{0.1}(OH)_2$ powders were weighed in a Li/(Ni+Co) equivalent ratio of 1.05/1 and mixed in ethanol for 30 minutes by ball-milling. The resultant mixture was subjected to a first heat-treatment for 10 hours at 450° C. and it was then mixed uniformly in a mortar grinder after being cooled to room temperature. A second heat-treatment was performed for 10 hours at 770° C. to produce a positive active material, $Li_{1.05}Ni_{0.9}Co_{0.1}O_2$ powder. The $Li_{1.05}Ni_{0.9}Co_{0.1}O_2$ powder was sieved using a −325 mesh.

The resultant $Li_{1.05}Ni_{0.9}Co_{0.1}O_2$ powder for a positive active material, KF 1300 for a binder material, and Super P for a conductive agent were mixed in a weight ratio of 94/3/3 in N-methyl pyrrolidone to prepare a positive active material slurry. Using the slurry, a coin cell-type half-cell was fabricated by the same procedure as in Comparative Example 1.

Comparative Example 7

$Mn(NO_3)_2$ and $Ni(NO_3)_2$ were dissolved to water to prepare a Mn—Ni-containing solution. $NH_4OH$ was added to control pH of the solution. Mn and Ni were coprecipitated to prepare $Mn_{0.75}Ni_{0.25}(OH)_2$.

LiOH, $Mn_{0.75}Ni_{0.25}(OH)_2$, and $Al_2O_3$ powders were weighed in a Li/(Mn+Ni)/Al equivalent ratio of 1/2/0.03, and mixed in a mortar grinder in ethanol for 30 minutes The resultant mixture was subjected to a first heat-treatment for 10 hours at 450° C., and it was then mixed uniformly in a mortar grinder after being cooled to room temperature. A second heat-treatment was performed for 15 hours at 750° C. to produce a positive active material, $LiMn_{1.5}Ni_{0.5}Al_{0.03}O_4$ powder. The $LiMn_{1.5}Ni_{0.5}Al_{0.03}O_4$ powder was sieved using meshes (Mesh No. 325).

The resultant $LiMn_{1.5}Ni_{0.5}Al_{0.03}O_4$ powder for a positive active material, KF 1300 for a binder material, and Super P for a conductive agent were mixed in a weight ratio of 94/3/3 in N-methylpyrrolidone to prepare a positive active material slurry. Using the slurry, a coin cell-type half-cell was fabricated by the same procedure as in Comparative Example 1.

Comparative Example 8

A coin cell-type half-cell was fabricated by the same procedure as in Comparative Example 1, except that LiOH, $Mn_{0.75}Ni_{0.25}(OH)_2$, and $Al_2O_3$ powders were mixed in a Li/(Mn+Ni)/Al equivalent ratio of 1/2/0.7 to produce a positive active material, $LiMn_{1.5}Ni_{0.5}Al_{0.7}O_4$ powder.

The following Reference Examples are embodiments of Korean patent application No. 2001-31530 where the lithium source, metal source, and doping-element-containing suspension were mixed simultaneously and the mixture was heat-treated to prepare a positive active material with doping elements.

Reference Example 1

A 5 wt % Al-isopropoxide suspension was prepared by adding 5 wt % of Al-isopropoxide powder to 95 wt % of ethanol.

$LiOH \cdot H_2O$ and $Co_3O_4$ powders and an Al-isopropoxide suspension were weighed in a Li/Co/Al equivalent ratio of 1/1/0.05, and mixed in a mortar grinder until all ethanol was evaporated. The resultant mixture was subjected to a first heat-treatment for 5 hours at 450° C. while purging with a stream of dry air, and it was then mixed uniformly in a mortar grinder after being cooled to room temperature. A second heat-treatment was performed for 10 hours at 800° C. while purging with a stream of dry air to produce a positive active material, $LiCoAl_{0.05}O_2$ powder. The $LiCoAl_{0.05}O_2$ powder was sieved using meshes (Mesh No. 325).

The resultant $LiCoAl_{0.05}O_2$ powder for a positive active material, polyvinylidene fluoride for a binder material, and a carbon conductive agent were mixed in a weight ratio of 96/2/2 in N-methylpyrrolidone to prepare a positive active material slurry. Using the slurry, a coin cell-type half-cell was fabricated by the same procedure as in Comparative Example 1.

Reference Example 2

A 5 wt % Al-isopropoxide suspension was prepared by adding 5 wt % of Al-isopropoxide powder to 95 wt % of ethanol.

$LiOH \cdot H_2O$ and $Co_3O_4$ powders and the Al-isopropoxide suspension were weighed in a Li/Co/Al equivalent ratio of 1/1/0.1, and mixed in a mortar grinder until all ethanol was evaporated. The resultant mixture was subjected to a first heat-treatment for 5 hours at 500° C. while purging with a stream of dry air, and it was then mixed uniformly in a mortar grinder after being cooled to room temperature. A second heat-treatment was performed for 10 hours at 850° C. while purging with a stream of dry air to produce a positive active material, $LiCoAl_{0.1}O_2$ powder. The $LiCoAl_{0.1}O_2$ powder was sieved using meshes (Mesh No. 325).

The resultant $LiCoAl_{0.1}O_2$ powder for a positive active material, polyvinylidene fluoride for a binder material, and a carbon conductive agent were mixed in a weight ratio of 96/2/2 in N-methylpyrrolidone to prepare a positive active material slurry. Using the slurry, a coin cell-type half-cell was fabricated by the same procedure as in Comparative Example 1.

Reference Example 3

A 5 wt % Al-isopropoxide suspension was prepared by adding 5 wt % of Al-isopropoxide powder to 95 wt % of ethanol.

$LiOH \cdot H_2O$ and $Co_3O_4$ powders and the Al-isopropoxide suspension were weighed in a Li/Co/Al equivalent ratio of 1/0.95/0.05, and mixed in a mortar grinder until all ethanol was evaporated. The resultant mixture was subjected to a first heat-treatment for 5 hours at 450° C. while purging with a stream of dry air, and it was then mixed uniformly in a mortar grinder after being cooled to room temperature. A second heat-treatment was performed for 10 hours at 800° C. while purging with a stream of dry air to produce a positive active material, $LiCo_{0.95}Al_{0.05}O_2$ powder. The $LiCo_{0.95}Al_{0.05}O_2$ powder was sieved using meshes (Mesh No. 325).

The resultant $LiCo_{0.95}Al_{0.05}O_2$ powder for a positive active material, polyvinylidene fluoride for a binder material, and a carbon conductive agent were mixed in a weight ratio of 96/2/2 in N-methylpyrrolidone to prepare a positive active material slurry. Using the slurry, a coin cell-type half-cell was fabricated by the same procedure as in Comparative Example 1.

Reference Example 4

A 5 wt % Al-isopropoxide suspension was prepared by adding 5 wt % of Al-isopropoxide powder to 95 wt % of ethanol.

$LiOH \cdot H_2O$ and $Co_3O_4$ powders and the Al-isopropoxide suspension were weighed in a Li/Co/Al equivalent ratio of 1/0.97/0.03, and mixed in a mortar grinder until all ethanol was evaporated. The resultant mixture was subjected to a first heat-treatment for 5 hours at 500° C. while purging with a stream of dry air, and it was then mixed uniformly in a mortar grinder after being cooled to room temperature. A second heat-treatment was performed for 10 hours at 775° C. while purging with a stream of dry air to produce a positive active material, $LiCo_{0.97}Al_{0.03}O_2$ powder. The $LiCo_{0.97}Al_{0.03}O_2$ powder was sieved using meshes (Mesh No. 325).

The resultant $LiCo_{0.97}Al_{0.03}O_2$ powder for a positive active material, polyvinylidene fluoride for a binder material, and a carbon conductive agent were mixed in a weight ratio of 96/2/2 in N-methylpyrrolidone to prepare a positive active material slurry. Using the slurry, a coin cell-type half-cell was fabricated by the same procedure as in Comparative Example 1.

Example 1

A 5 wt % Al-isopropoxide suspension was prepared by adding 5 wt % of Al-isopropoxide powder to 95 wt % of ethanol.

$LiOH \cdot H_2O$ and $Co_3O_4$ powders and the Al-isopropoxide suspension were weighed in a Li/Co/Al equivalent ratio of 1/1/0.1, and the $Co_3O_4$ powder was added to the Al-isopropoxide suspension. The mixture was mixed in a mortar grinder and dried until all ethanol was evaporated to obtain $Co_3O_4$ surface-treated with the Al-containing compound.

The surface-treated $Co_3O_4$ and the $LiOH \cdot H_2O$ were mixed by ball-milling for 2 hours. The resultant mixture was subjected to a first heat-treatment for 5 hours at 450° C. while purging with a stream of dry air, and it was then mixed uniformly in a mortar grinder after being cooled to room temperature. A second heat-treatment was performed for 10 hours at 800° C. while purging with a stream of dry air to produce a positive active material, $LiCo_{0.95}Al_{0.05}O_2$ powder. The $LiCo_{0.95}Al_{0.05}O_2$ powder was sieved using meshes (Mesh No. 325).

The resultant $LiCo_{0.95}Al_{0.05}O_2$ powder for a positive active material, polyvinylidene fluoride for a binder material, and a carbon conductive agent were mixed in a weight ratio of 96/2/2 in N-methylpyrrolidone to prepare a positive active material slurry. Using the slurry, a coin cell-type half-cell was fabricated by the same procedure as in Comparative Example 1.

Example 2

A coin cell-type half-cell was fabricated by the same procedure as in Example 1, except that the equivalent ratio of Li/Co/Al was 1/1/0.05 to produce a positive active material, $LiCoAl_{0.50}O_2$ powder.

Example 3

A coin cell-type half-cell was fabricated by the same procedure as in Example 1, except that the equivalent ratio of Li/Co/Al was 1/0.95/0.05, and the second heat-treatment was performed for 10 hours at 850° C., to produce a positive active material, $LiCo_{0.95}Al_{0.05}O_2$ powder.

Example 4

A coin cell-type half-cell was fabricated by the same procedure as in Example 1, except that the equivalent ratio of Li/Co/Al was 1/0.93/0.07 to produce a positive active material, $LiCo_{0.93}Al_{0.07}O_2$ powder.

Example 5

A 5 wt % Al-isopropoxide suspension was prepared by adding 5 wt % of Al-isopropoxide powder to 95 wt % of ethanol.

$LiOH.H_2O$ and $Co_3O_4$ powders and the Al-isopropoxide suspension were weighed in a Li/Co/Al equivalent ratio of 1/1/0.05. The $Co_3O_4$ powder was added to the Al-isopropoxide suspension. The mixture was mixed in a mortar grinder until all ethanol was evaporated, and it was then subjected to a preheat treatment for 5 hours at 500° C. to obtain a Co—Al-containing solid solution compound powder.

The Co—Al-containing solid solution compound powder and the $LiOH.H_2O$ were mixed by ball-milling for 2 hours. The resultant mixture was subjected to a first heat-treatment for 5 hours at 450° C. while purging with a stream of dry air, and it was then mixed uniformly in a mortar grinder after being cooled to room temperature. A second heat-treatment was performed for 10 hours at 800° C. while purging with a stream of dry air to produce a positive active material, $LiCoAl_{0.05}O_2$ powder. The $LiCoAl_{0.50}O_2$ powder was sieved using meshes (Mesh No. 325).

The resultant $LiCoAl_{0.05}O_2$ powder for a positive active material, polyvinylidene fluoride for a binder material, and a carbon conductive agent were mixed in a weight ratio of 96/2/2 in N-methylpyrrolidone to prepare a positive active material slurry. Using the slurry, a coin cell-type half-cell was fabricated by the same procedure as in Comparative Example 1.

Example 6

A coin cell-type half-cell was fabricated by the same procedure as in Example 5, except that the equivalent ratio of Li/Co/Al was 1/1/0.01 and the second heat-treatment was performed for 10 hours at 775° C. to produce a positive-active material, $LiCoAl_{0.01}O_2$ powder.

Example 7

A coin cell-type half-cell was fabricated by the same procedure as in Example 5, except that the equivalent ratio of Li/Co/Al was 1/0.95/0.05 to produce a positive active material, $LiCoO_{0.95}Al_{0.05}O_2$ powder.

Example 8

A coin cell-type half-cell was fabricated by the same procedure as in Example 5, except that the equivalent ratio of Li/Co/Al was 1/0.9/0.1 to produce a positive active material, $LiCo_{0.9}Al_{0.1}O_2$ powder.

Example 9

A 5 wt % B-containing suspension was prepared by adding 5 wt % of $B_2O_3$ powder to 95 wt % of water.

$LiOH.H_2O$ and $Co_3O_4$ powders and the B-containing suspension were weighed in a Li/Co/B equivalent ratio of 1/1/0.1. The $Co_3O_4$ powder was added to the B-containing suspension. The mixture was mixed in a mortar grinder and dried until all water was evaporated, and it was then dried further in an oven for 5 hours to obtain $Co_3O_4$ surface-treated with the B-containing compound.

The surface-treated $Co_3O_4$ and the $LiOH.H_2O$ were mixed by ball-milling for 2 hours. The resultant mixture was subjected to a first heat-treatment for 5 hours at 500° C. while purging with a stream of dry air, and it was then mixed uniformly in a mortar grinder after being cooled to room temperature. A second heat-treatment was performed for 10 hours at 800° C. while purging with a stream of dry air to produce a positive active material, $LiCoB_{0.1}O_2$ powder. The $LiCoB_{0.1}O_2$ powder was sieved using meshes (Mesh No. 325).

The resultant $LiCoB_{0.1}O_2$ powder for a positive active material, polyvinylidene fluoride for a binder material, and a carbon conductive agent were mixed in a weight ratio of 96/2/2 in N-methyl pyrrolidone to prepare a positive active material slurry. Using the slurry, a coin cell-type half-cell was fabricated by the same procedure as in Comparative Example 1.

Example 10

A coin cell-type half-cell was fabricated by the same procedure as in Example 9, except that the equivalent ratio of Li/Co/B was 1/0.93/0.07, and the second heat-treatment was performed for 10 hours at 825° C. to produce a positive active material, $LiCo_{0.93}B_{0.07}O_2$ powder.

Example 11

A 5 wt % B-containing suspension was prepared by adding 5 wt % of $B_2O_3$ powder to 95 wt % of water.

$LiOH.H_2O$ and $Co_3O_4$ powders and the B-containing suspension were weighed in a Li/Co/B equivalent ratio of 1/1/0.05. The $Co_3O_4$ powder was added to the B-containing suspension. The mixture was mixed in a mortar grinder and dried until all water was evaporated, and it was then dried further in an oven for 5 hours. Subsequent to drying, preheat treatment was performed for 5 hours at 500° C. to obtain Co—B-containing solid solution compound powder.

The Co—B-containing solid solution compound powder and the $LiOH.H_2O$ were mixed by ball-milling for 2 hours. The resultant mixture was subjected to a first heat-treatment for 5 hours at 450° C. while purging with a stream of dry air, and it was then mixed uniformly in a mortar grinder after being cooled to room temperature. A second heat-treatment was performed for 10 hours at 800° C. while purging with a stream of dry air to produce a positive active material, LiCoB$_{0.05}$O$_2$ powder. The LiCoB$_{0.05}$O$_2$ powder was sieved using meshes (Mesh No. 325).

The resultant LiCoB$_{0.05}$O$_2$ powder for a positive active material, polyvinylidene fluoride for a binder material, and a carbon conductive agent were mixed in a weight ratio of 96/2/2 in N-methylpyrrolidone to prepare a positive active material slurry. Using the slurry, a coin cell-type half-cell was fabricated by the same procedure as in Comparative Example 1.

Example 12

A coin cell-type half-cell was fabricated by the same procedure as in Example 11, except that the equivalent ratio of Li/Co/B was 1/0.9/0.1 to produce a positive active material, LiCo$_{0.9}$B$_{0.1}$O$_2$ powder.

Example 13

Mn(NO$_3$)$_2$ and Ni(NO$_3$)$_2$ were dissolved in water to prepare a Mn—Ni-containing solution, and NH$_4$OH was added to control pH of the solution. Mn and Ni were coprecipitated to prepare Mn$_{0.75}$Ni$_{0.25}$(OH)$_2$.

A 5 wt % Al-isopropoxide suspension was prepared by adding 5 wt % of Al-isopropoxide powder to 95 wt % of ethanol.

LiOH.H$_2$O, Mn$_{0.75}$Ni$_{0.25}$(OH)$_2$, and the Al-isopropoxide suspension were weighed in a Li/(Mn+Ni)/Al equivalent ratio of 1/2/0.01. The Mn$_{0.75}$Ni$_{0.25}$(OH)$_2$ powder was added to the Al-isopropoxide suspension. The mixture was mixed in a mortar grinder and dried until all ethanol was evaporated to obtain Mn$_{0.75}$Ni$_{0.25}$(OH)$_2$ surface-treated with the Al-containing compound.

The surface-treated Mn$_{0.75}$Ni$_{0.25}$(OH)$_2$ and the LiOH.H$_2$O were mixed by ball-milling for hours. The resultant mixture was subjected to a first heat-treatment for 5 hours at 500° C. while purging with a stream of dry air, and it was then mixed uniformly in a mortar grinder after being cooled to room temperature. A second heat-treatment was performed for 10 hours at 800° C. while purging with a stream of dry air to produce a positive active material, LiMn$_{1.5}$Ni$_{0.5}$Al$_{0.01}$O$_4$ powder. The LiMn$_{1.5}$Ni$_{0.5}$Al$_{0.01}$O$_4$ powder was sieved using meshes (Mesh No. 325).

The resultant LiMn$_{1.5}$Ni$_{0.5}$Al$_{0.01}$O$_4$ powder for a positive active material, polyvinylidene fluoride for a binder material, and a carbon conductive agent were mixed in a weight ratio of 96/2/2 in N-methylpyrrolidone to prepare a positive active material slurry. Using the slurry, a coin cell-type half-cell was fabricated by the same procedure as in Comparative Example 1.

Example 14

Ni(NO$_3$)$_2$ and Co(NO$_3$)$_2$ were dissolved in water to respectively prepare a Ni-containing solution and a Co-containing solution, and the two solutions were mixed and NH$_4$OH was added to control pH of the mixed solution. Ni and Co were coprecipitated to prepare Ni$_{0.9}$Co$_{0.1}$(OH)$_2$.

A 5 wt % Al-isopropoxide suspension was prepared by adding 5 wt % of Al-isopropoxide powder to 95 wt % of ethanol.

LiOH, Ni$_{0.9}$Co$_{0.1}$(OH)$_2$, and the Al-isopropoxide suspension were weighed in a Li/(Ni+Co)/Al equivalent ratio of 1/1/0.01. The Ni$_{0.9}$Co$_{0.1}$(OH)$_2$ powder was added to the Al-isopropoxide suspension. The mixture was mixed in a mortar grinder and dried until all ethanol was evaporated, and it was then subjected to a preheat treatment for 5 hours at 500° C. to obtain Ni—Co—Al-containing solid solution compound powder.

The Ni—Co—Al-containing solid solution compound powder and the LiOH were mixed by ball-milling for 2 hours. The resultant mixture was subjected to a first heat-treatment for 5 hours at 500° C. while purging with a stream of dry air, and it was then mixed uniformly in a mortar grinder after being cooled to room temperature. A second heat-treatment was performed for 10 hours at 800° C. while purging with a stream of dry air to produce a positive active material, LiNi$_{0.9}$Co$_{0.1}$Al$_{0.01}$O$_2$ powder. The LiNi$_{0.9}$Co$_{0.1}$Al$_{0.01}$O$_2$ powder was sieved using meshes (Mesh No. 325).

The resultant LiNi$_{0.9}$Co$_{0.1}$Al$_{0.01}$O$_2$ powder for a positive active material, polyvinylidene fluoride for a binder material, and a carbon conductive agent were mixed in a weight ratio of 96/2/2 in N-methylpyrrolidone to prepare a positive active material slurry. Using the slurry, a coin cell-type half-cell was fabricated by the same procedure as in Comparative Example 1.

Example 15

Ni(NO$_3$)$_2$, Mn(NO$_3$)$_2$, and Co(NO$_3$)$_2$ were respectively dissolved in water to prepare a Ni-containing solution, a Mn-containing solution, and a Co-containing solution. The three solutions were mixed, and NH$_4$OH was added to control pH of the mixed solution. Ni, Mn, and Co were coprecipitated to prepare Ni$_{0.8}$Mn$_{0.1}$Co$_{0.1}$(OH)$_2$.

A 5 wt % Al-isopropoxide suspension was prepared by adding 5 wt % of Al-isopropoxide powder to 95 wt % of ethanol.

LiOH, Ni$_{0.8}$Mn$_{0.1}$Co$_{0.1}$(OH)$_2$, and the Al-isopropoxide suspension were weighed in a Li/(Ni+Mn+Co)/Al equivalent ratio of 1.03/1/0.01. The Ni$_{0.8}$Mn$_{0.1}$Co$_{0.1}$(OH)$_2$ powder was added to the Al-isopropoxide suspension. The mixture was mixed in a mortar grinder and dried until all ethanol was evaporated, and it was then subjected to a preheat treatment for 5 hours at 500° C. to obtain Ni—Mn—Co—Al-containing solid solution compound powder.

The Ni—Mn—Co—Al-containing solid solution compound powder and the LiOH were mixed by ball-milling for 2 hours. The resultant mixture was subjected to a first heat-treatment for 5 hours at 500° C. while purging with a stream of dry air, and it was then mixed uniformly in a mortar grinder after being cooled to room temperature. A second heat-treatment was performed for 10 hours at 800° C. while purging with a stream of dry air to produce a positive active material, Li$_{1.03}$Ni$_{0.8}$Mn$_{0.1}$Co$_{0.1}$Al$_{0.01}$O$_2$ powder. The Li$_{1.03}$Ni$_{0.8}$Mn$_{0.1}$Co$_{0.1}$Al$_{0.01}$O$_2$ powder was sieved using meshes (Mesh No. 325).

The resultant Li$_{1.03}$Ni$_{0.8}$Mn$_{0.1}$Co$_{0.1}$Al$_{0.01}$O$_2$ powder for a positive active material, polyvinylidene fluoride for a binder material, and a carbon conductive agent were mixed in a weight ratio of 96/2/2 in N-methylpyrrolidone to prepare a positive active material slurry. Using the slurry, a coin cell-type half-cell was fabricated by the same procedure as in Comparative Example 1.

Figure 2:
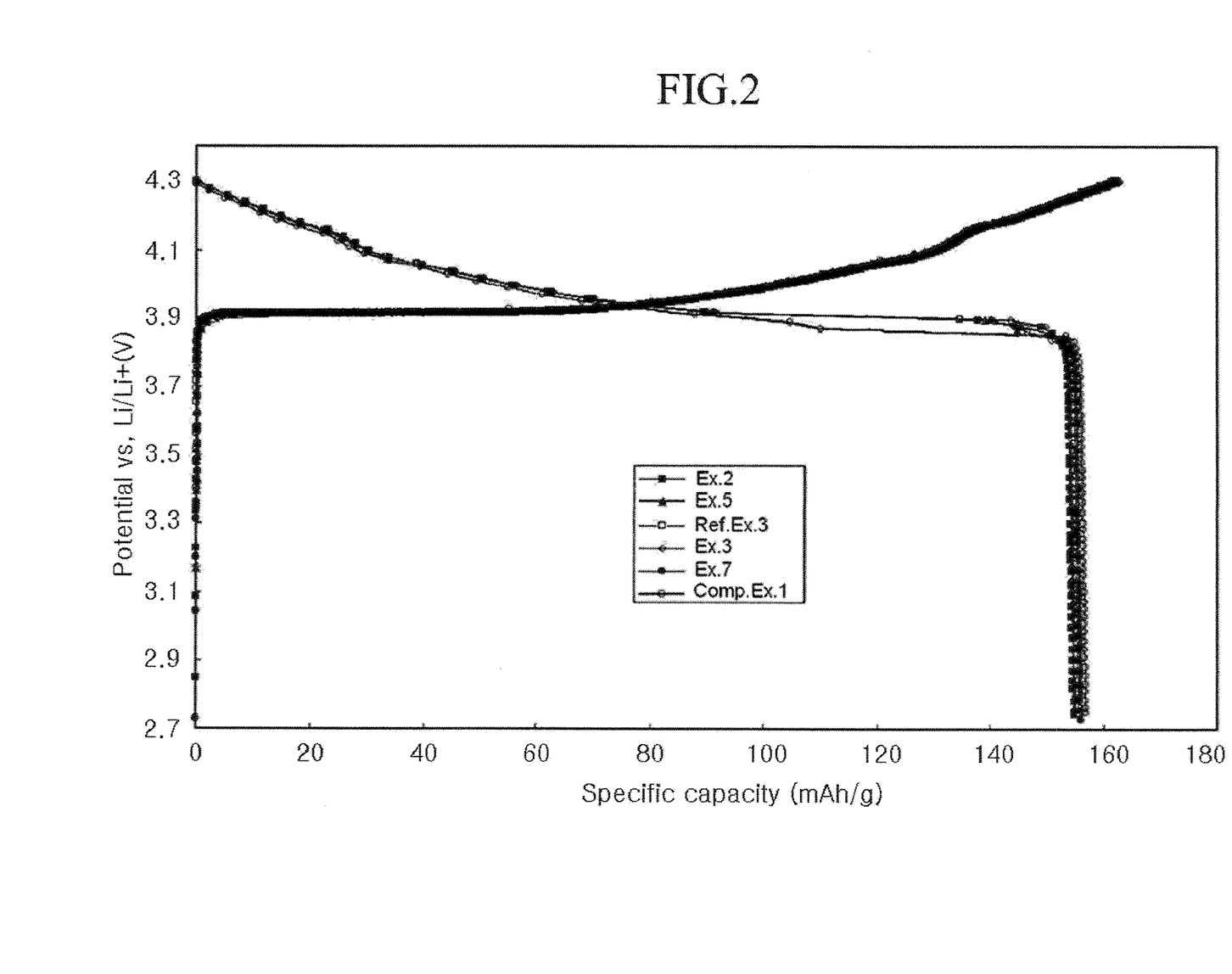
FIG. 2 is a graph showing charge and discharge characteristics at a low rate of the battery cells according to Comparative Example 1, Reference Example 3, and Examples 2, 3, 5, and 7 of the present invention, respectively.
Figure 3:
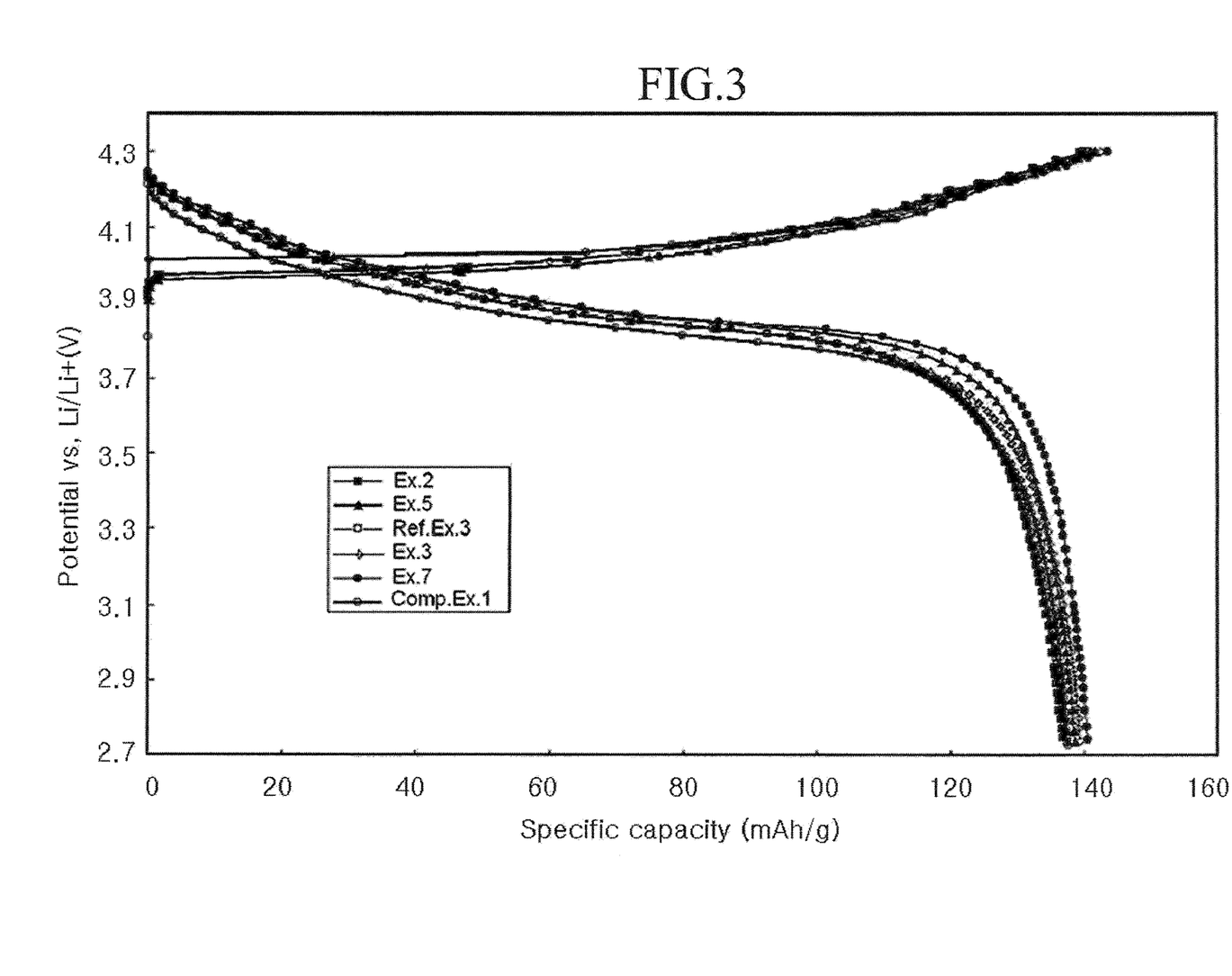
FIG. 3 is a graph showing charge and discharge characteristics at a high rate of the battery cells according to Comparative Example 1, Reference Example 3, and Examples 2, 3, 5, and 7 of the present invention, respectively.

In order to evaluate the charge-discharge characteristics of the coin-type half-cells of Comparative Examples, Reference Examples, and Examples at various rates, the cells were charged-discharged. Results of the charge-discharge characteristics at various current densities (0.1 C and 1 C) of Comparative Example 1, Reference Example 3, and Examples 2, 3, 5, and 7 of the present invention are respectively shown in FIGS. 2 and 3. As shown in FIG. 2, the discharge characteristics of the cells of Examples 2, 3, 5, and 7 do not differ from those of Comparative Example 1 or Reference Example 3 at a low rate of 0.1 C. However, the cells of Examples 2, 3, 5, and 7 are superior in discharge characteristics (i.e., in discharge potential and discharge capacity) to those of Comparative Example 1 and Reference Example 3, as shown in FIG. 3. When the current density is increased from a low rate (0.1 C) to a high rate (1.0 C), the superiority is particularly pronounced.

Figure 4A:
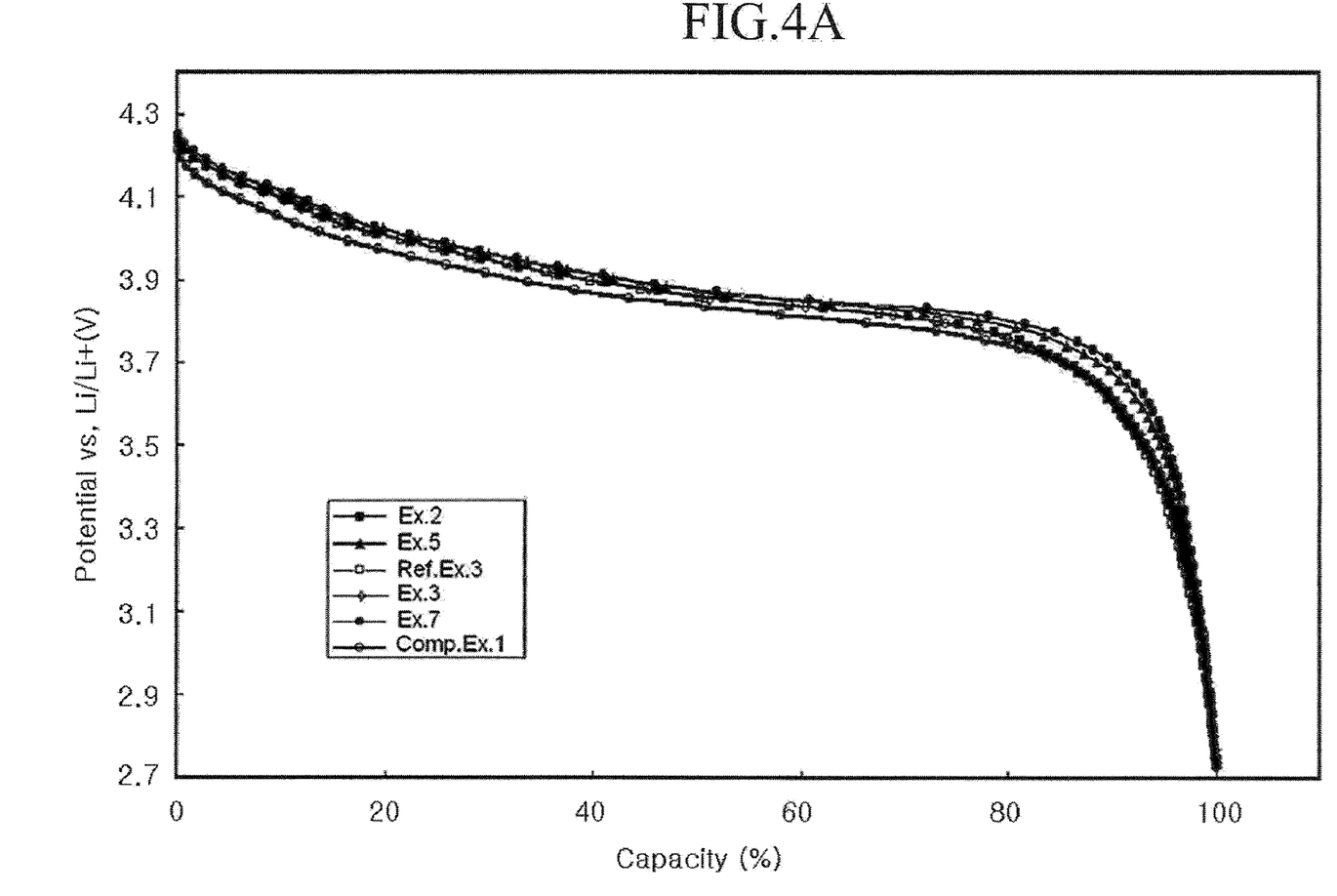
FIG. 4A is a graph showing a variance of average charge and discharge potential of the battery cells according to Comparative Example 1, Reference Example 3, and Examples 2, 3, 5, and 7, respectively.
Figure 4B:
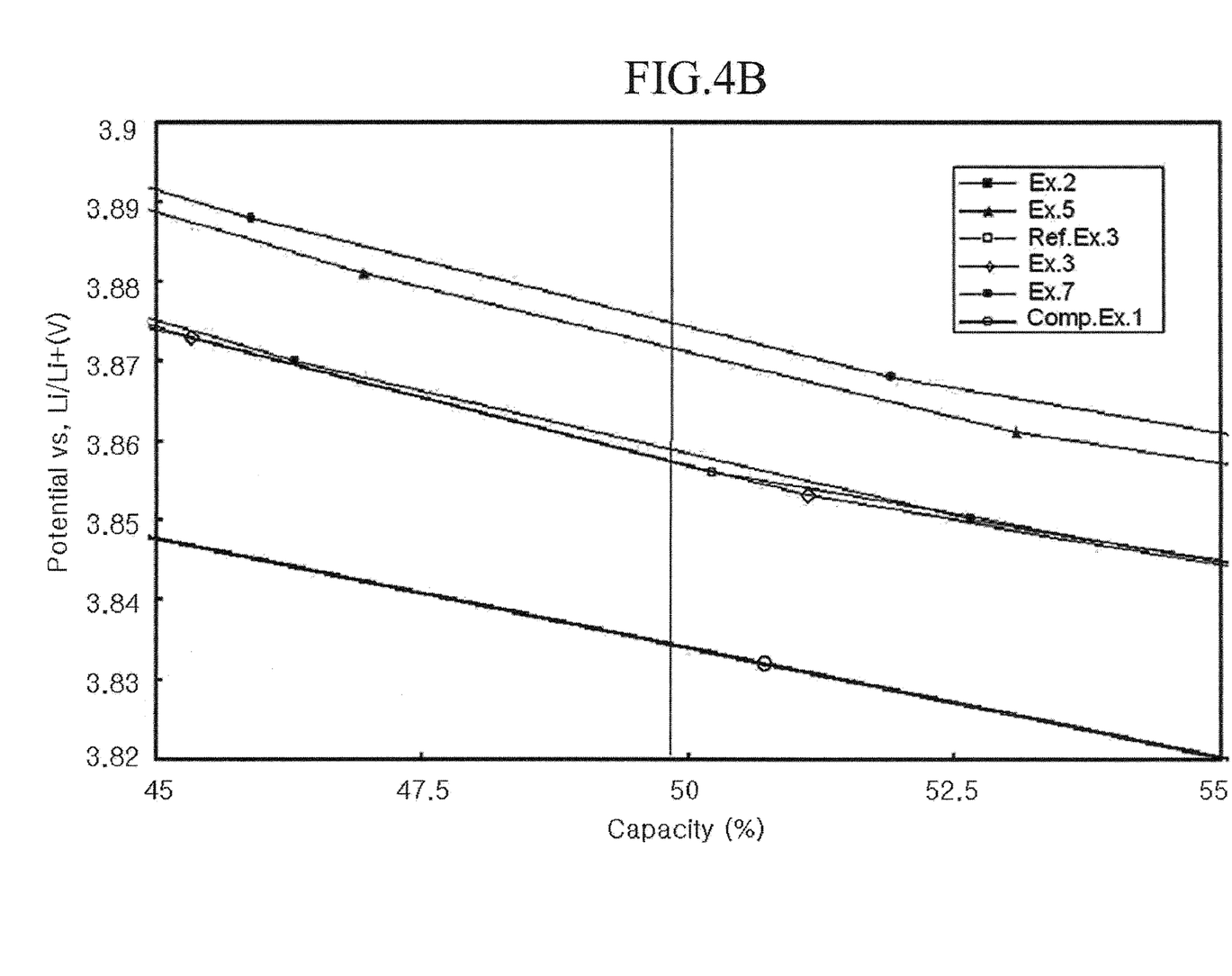
FIG. 4B is an enlarged view of a portion of FIG. 3A.

FIG. 4A shows mid-point voltages of Comparative Example 1, Reference Example 3, and Examples 2, 3, 5, and 7, which are voltages where discharge capacity is 50% of maximum discharge capacity at a 1 C rate. FIG. 4B is an enlarged view of FIG. 4A. The results of FIGS. 4A and 4B are represented in Table 1.

TABLE 1

|  | mid-point voltages (V) | Difference based on Comparative Example 1 (V) |
| --- | --- | --- |
| Comparative Example 1 | 3.834 | 0 |
| Reference Example 3 | 3.857 | 0.023 |
| Example 2 | 3.858 | 0.024 |
| Example 3 | 3.857 | 0.023 |
| Example 5 | 3.871 | 0.037 |
| Example 7 | 3.874 | 0.040 |

As shown in Table 1, mid-point voltages of Examples were higher than that of Comparative Example 1 by 0.023 to 0.040V. Enhancement of the mid-point voltage indicates that the power capabilities were improved.

Figure 5:
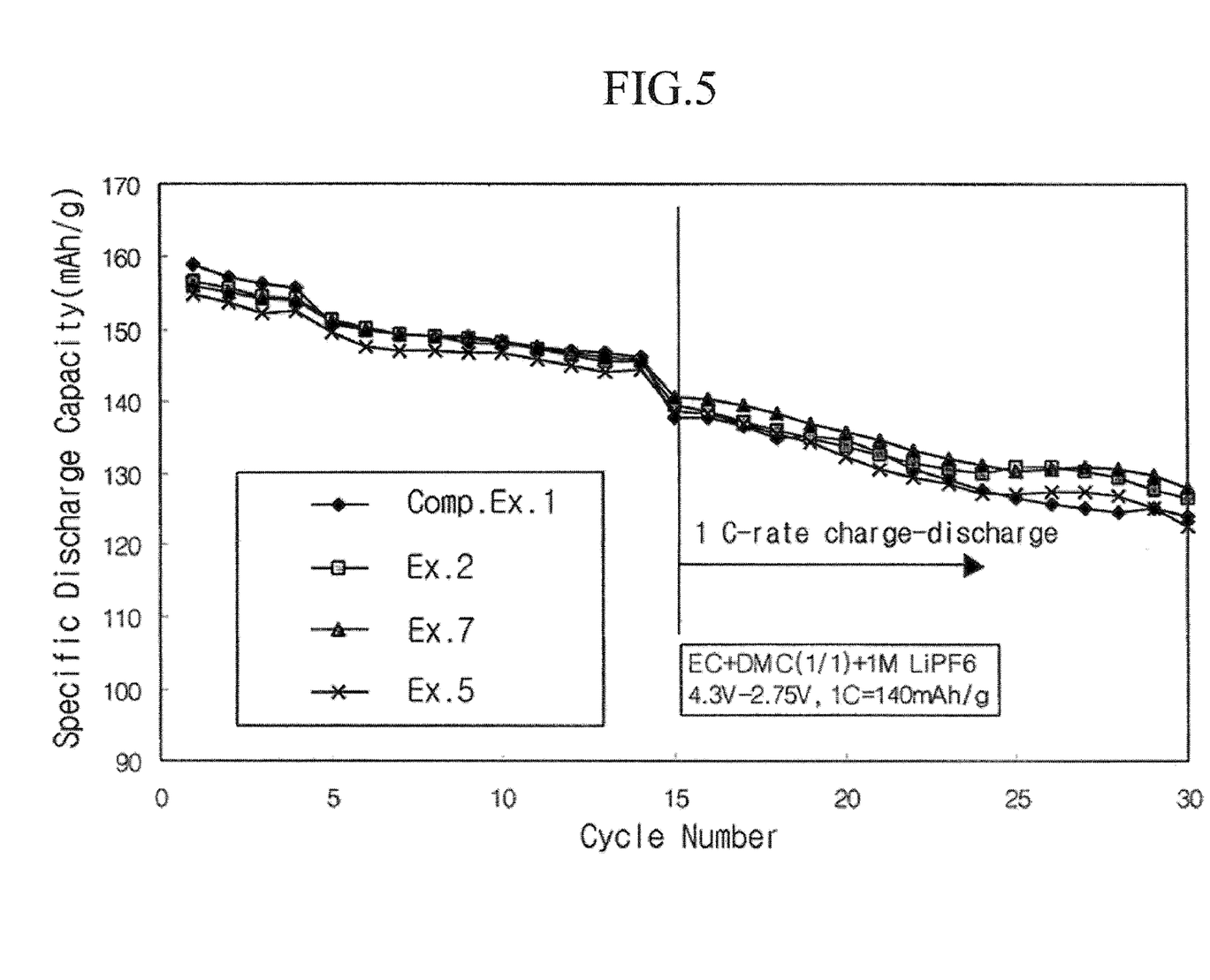
FIG. 5 is a graph showing cycle life characteristics of battery cells according to Examples 2, 5, and 7 of the present invention, respectively.

FIG. 5 shows the results of charge-discharge cycling of the cells of Comparative Example 1, Reference Example 2, and Examples 2, 5, and 7 of the present invention at a 0.1 C rate (1 cycle), a 0.2 C rate (3 cycles), a 0.5 C rate (10 cycles), and a 1 C rate (116 cycles). As indicated in FIG. 5, the cells of Examples 2, 5, and 7 have superior cycle-life characteristics to that of Comparative Example by about 5%.

A portion of slurry according to Comparative Examples and Examples were placed in one location for 24 hours to evaluate characteristics of the slurries. They were evaluated visually as to whether gelation occurred, and the results are shown in Table 2.

TABLE 2

|  | Characteristics of Slurries |
| --- | --- |
| Comparative Example 4 | Gelation |
| Comparative Example 5 | Gelation |
| Comparative Example 6 | Gelation |
| Comparative Example 7 | Gelation |
| Comparative Example 8 | Gelation |
| Example 13 | Good |
| Example 14 | Good |
| Example 15 | Good |

As shown in Table 2, the slurries of Comparative Examples 4 to 8 gelled after 24 hours, while the slurries of Examples 13 to 15 had good characteristics without occurrence of gelation.

The positive active material prepared in accordance with the present invention improves electrochemical characteristics including cycle life, discharge potential, and power capability of a lithium secondary battery.

While the present invention has been described in detail with reference to the embodiments, those skilled in the art will appreciate that various modifications and substitutions can be made thereto without departing from the spirit and scope of the present invention as set forth in the accompanying claims and equivalents thereof.

What is claimed is:

1. A process of preparing a positive active material for a lithium secondary battery, comprising the steps of:
    adding a metal source to a doping element-containing coating liquid including a doping element-containing compound to form a surface-treated metal source having a surface-treatment layer including the doping element-containing compound on a surface of the metal source, wherein the metal source is selected from the group consisting of cobalt, manganese, nickel, and a combination thereof, and the metal source and the doping element are not the same, the doping element being at least one selected from the group consisting of Mg, Al, K, Na, Ca, Si, Fe, Cu, Zn, Ti, Sn, V, Ge, Ga, B, P, Se, Bi, As, Zr, Cr, Sr, Sc, Y, a rare earth element, and a combination thereof;
    drying the surface-treated metal source to prepare a positive active material precursor;
    mixing the positive active material precursor with a lithium source; and
    heat-treating the mixture to produce the positive active material.

2. The process of claim 1, wherein the doping element is soluble or suspendable in an organic solvent or water.

3. The process of claim 1, wherein the doping element is at least one selected from the group consisting of Mg, Al, Fe, Zr, Cr, Sr, V, and a combination thereof.

4. The process of claim 1, wherein the metal source is a material including nickel or manganese-nickel.

5. The process of claim 1, wherein an amount of the doping-element is in a range from 0.01 to 20 percent by weight of the doping-element-containing coating liquid.

6. The process of claim 1, wherein the drying step is performed at a temperature in the range from room temperature to 300° C., for 1 to 24 hours.

7. The process of claim 1, further comprising the step of preheating after the drying step but before the mixing step to produce a solid solution compound including the doping element and the metal of the metal source.

8. The process of claim 1, wherein the heat-treatment step comprises the steps of first heat-treating the mixture at 400° C. to 500° C. for 5 to 20 hours, and second heat-treating the mixture at 700° C. to 900° C. for 10 to 30 hours.

9. The process of claim 1, wherein the positive active material is a compound having one of the following formulas (1) to (11):

$$Li_xMn_{1-y}M'_zA_2 \quad (1)$$

$$Li_xMn_{1-y}M'_zO_{2-a}X_a \quad (2)$$

$$Li_xMn_{2-y}M'_zA_4 \quad (3)$$

$$Li_xCo_{1-y}M'_zA_2 \quad (4)$$

$$Li_xCo_{1-y}M'_zO_{2-a}X_a \quad (5)$$

$$Li_xNi_{1-y}M'_zA_2 \quad (6)$$

$$Li_xNi_{1-y}M'_zO_{2-a}X_a \quad (7)$$

$$Li_xNi_{1-y}Co_zM'_wA_b \quad (8)$$

$$Li_xNi_{1-y}Co_zM'_wO_{2-b}X_b \quad (9)$$

$$Li_xNi_{1-y}Mn_zM'_wA_b \quad (10)$$

$$Li_xNi_{1-y-z}Mn_zM'_wO_{2-b}X_b \quad (11),$$

wherein
0.9≦x≦1.1; 0≦y≦0.5; 0<z≦0.5; 0<w≦2; 0≦a≦0.5; 0≦b≦2;

M' is at least one doping element selected from the group consisting of Mg, Al, K, Na, Ca, Si, Fe, Cu, Zn, Ti, Sn, V, Ge, Ga, B, P, Se, Bi, As, Zr, Cr, Sr, and a rare earth element;

A is at least one element selected from the group consisting of O, F, S, and P; and X is at least one element selected from the group consisting of F, S, and P.

* * * * *